United States Patent
Konyari

(10) Patent No.: US 11,619,404 B2
(45) Date of Patent: Apr. 4, 2023

(54) GEOTHERMAL INSULATION SYSTEM AND METHOD

(71) Applicant: Civis-Therm Kft., Hajduboszormeny (HU)

(72) Inventor: Zoltan Konyari, Hajduboszormeny (HU)

(73) Assignee: CIVIS-THERM KFT., Hajduboszormeny (HU)

( * ) Notice: Subject to any disclaimer, the term of this patent is extended or adjusted under 35 U.S.C. 154(b) by 553 days.

(21) Appl. No.: 16/620,962

(22) PCT Filed: Jun. 11, 2018

(86) PCT No.: PCT/HU2018/050026
§ 371 (c)(1),
(2) Date: Dec. 10, 2019

(87) PCT Pub. No.: WO2018/229518
PCT Pub. Date: Dec. 20, 2018

(65) Prior Publication Data
US 2020/0103128 A1    Apr. 2, 2020

(30) Foreign Application Priority Data
Jun. 12, 2017   (HU) .................... P1700248

(51) Int. Cl.
*F24F 5/00* (2006.01)
*E04B 1/74* (2006.01)
*E04F 17/04* (2006.01)

(52) U.S. Cl.
CPC ............... *F24F 5/005* (2013.01); *E04B 1/74* (2013.01); *E04F 17/04* (2013.01)

(58) Field of Classification Search
CPC ........ F24F 5/005; F24F 5/0046; F24F 5/0075; F24F 2005/0057; F24T 10/10; E04B 1/74;
(Continued)

(56) References Cited

U.S. PATENT DOCUMENTS 1,297,633 A * 3/1919 Ashley .................... F25D 16/00
165/104.34
4,028,854 A * 6/1977 Diggs ................. F24D 11/0221
52/168
(Continued)

FOREIGN PATENT DOCUMENTS

FR          2958376 A1   10/2011
HU          214769 B     5/1998
(Continued)

*Primary Examiner* — Brian E Glessner
*Assistant Examiner* — Adam G Barlow
(74) *Attorney, Agent, or Firm* — Olson & Cepuritis, Ltd.

(57) ABSTRACT

The invention relates to a geothermal insulation system (10) for the insulation of an external surface (16) of a building (12), characterised by comprising:
  internal insulation panels (24),
  first internal spacers (22) attaching the internal insulation panels (24) onto the external surface (16) of a wall (14) of the building (12) in the mounted state such that an internal air chamber (20) is left between the internal insulation panels (24) and the external surface (16) of the wall (14),
  external insulation panels (34),
  second spacers (32) attaching the external insulation panels (34) onto an external side of the internal insulation panels (24) in the mounted state such that an external air chamber (30) is left between the external insulation panels (34) and the external side of the internal insulation panels (24) and an upper region (31)
(Continued)

Figure 1:
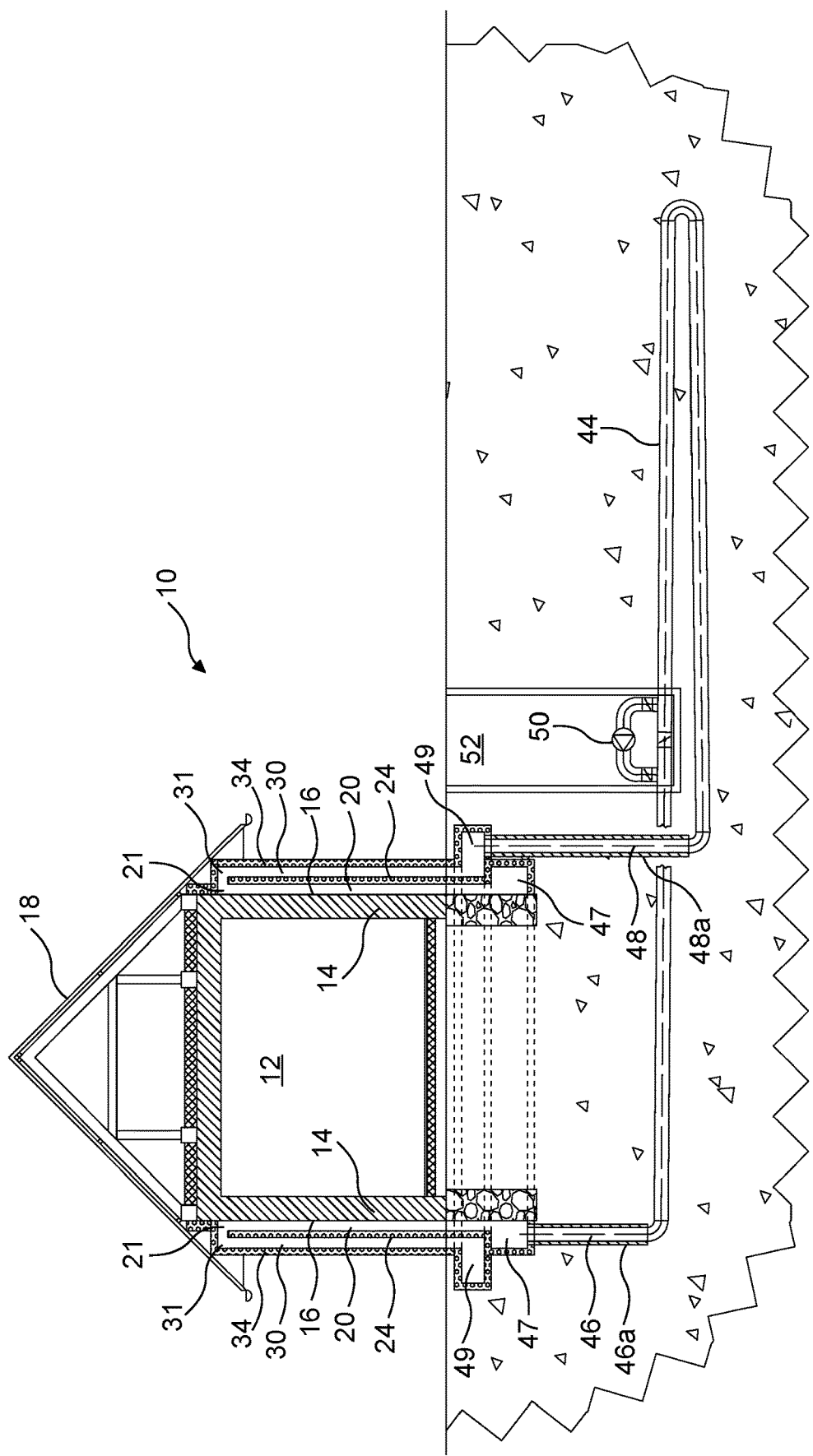

of the external air chamber (30) is in air communication with an upper region (21) of the internal air chamber (20),
a soil-air heat exchanger (44) recessed into the soil,
a first air duct (46) connecting the soil-air heat exchanger (44) with the internal air chamber (20),
a second air duct (48) connecting the soil-air heat exchanger (44) with the external air chamber (30).

The invention further relates to a method for the insulation of an external surface (16) of a building (12) with the use of geothermal energy.

16 Claims, 6 Drawing Sheets

(58) Field of Classification Search
CPC . E04B 1/7608; E04B 1/62; E04B 1/76; E04B 1/78; E04B 1/88; E04F 17/04; E04F 13/077; Y02B 30/54; Y02B 10/20; Y02B 10/408; Y02A 30/272; Y02E 10/44
USPC .................. 52/169.1, 169.7, 302.1, 302.3
See application file for complete search history.

(56) References Cited

U.S. PATENT DOCUMENTS

| | | | | |
|---|---|---|---|---|
| 4,295,415 A * | 10/1981 | Schneider, Jr. | ....... | F24D 11/007 454/366 |
| 4,408,596 A * | 10/1983 | Worf | ....... | F24S 20/66 126/633 |
| 4,517,958 A * | 5/1985 | Worf | ....... | F24F 5/0046 126/633 |
| 4,557,084 A * | 12/1985 | Dumbeck | ....... | E02D 31/008 52/741.13 |
| 5,372,016 A * | 12/1994 | Rawlings | ....... | F24T 10/30 62/238.7 |
| 5,761,864 A * | 6/1998 | Nonoshita | ....... | E04D 13/17 52/95 |
| 5,954,046 A * | 9/1999 | Wegler | ....... | F24F 12/006 126/620 |
| 6,319,115 B1 * | 11/2001 | Shingaki | ....... | F24F 5/0075 165/909 |
| 6,843,718 B2 * | 1/2005 | Schmitz | ....... | F24F 5/0075 454/251 |
| 8,424,590 B2 * | 4/2013 | Calamaro | ....... | F24F 5/005 165/56 |
| 2003/0207663 A1* | 11/2003 | Roff | ....... | A61L 9/00 454/186 |
| 2007/0056304 A1* | 3/2007 | Everett | ....... | F24F 5/0075 62/260 |
| 2009/0260776 A1* | 10/2009 | Calamaro | ....... | F28D 20/0052 165/45 |
| 2012/0125019 A1* | 5/2012 | Sami | ....... | F25B 30/06 62/235.1 |
| 2020/0103128 A1* | 4/2020 | Konyari | ....... | E04F 17/04 |
| 2022/0349175 A1* | 11/2022 | Schoenhard | ....... | E04B 1/7654 |

FOREIGN PATENT DOCUMENTS

| | | |
|---|---|---|
| HU | 217496 B | 2/2000 |
| KR | 101653519 B1 | 9/2016 |

* cited by examiner

GEOTHERMAL INSULATION SYSTEM AND METHOD

CROSS-REFERENCE TO RELATED APPLICATIONS

This application is a U.S. National Stage of PCT/HU2018/050026, filed Jun. 11, 2018, which claims priority of Hungarian Patent Application No. P1700248, filed Jun. 12, 2017, each of which is incorporated herein by reference.

The invention relates to a geothermal insulation system for the insulation of the external surfaces of buildings, especially for the provision of frost-free buildings without the use of auxiliary energy.

The invention further relates to a method for the insulation of the external surfaces of buildings using geothermal energy.

With the development of environmental awareness green energy obtained from sustainable sources of energy is gaining and increasingly important role. This energy also includes geothermal energy, in other words heat energy obtained from the earth. The thermal inertia of the earth is exceptionally large, this is why at a depth of about one and a half metres there is a constant temperature of approximately 7 to 10° C., which may be used for both heating and cooling. Geothermal energy is extracted using heat pumps, which have a heat exchanger installed underground in the soil, which implements the exchange of heat between the medium flowing in the heat pump and the soil. There are differences in design between geothermal collectors (a horizontal pipe system installed at a depth of approx. 1.5 metres) and geothermal probes (a vertical pipe system running to a depth of as much as one kilometre). In the winter the soil heats up the medium flowing through the heat exchanger, this heated medium is transported into the building, where it heats up the air while cooling down. The cooled medium is transported back into the heat exchanger, where it is heated up once again. In the summer the opposite process takes place, the medium in the heat exchanger cools down, then when it reaches the inside of the building it cools down the air while being heated up. The warm medium is returned to the heat exchanger, where it cools down once again. Usually water or another environmentally friendly liquid is used as the medium, which supplies heat to or extracts heat from the air in the building in the interior heat exchanger provided as an air pump. The heated or cooled air is characteristically transported to the various rooms in the building via a ventilation system. The disadvantage of the solution is that its construction is expensive and requires the installation of one or more air pumps and several fans. The cooling/heating liquid must be protected from frost while it is transported to the frost-free region of soil located at the appropriate depth, which causes problems especially if the geothermal heat exchanger is to be switched off for extended periods during the winter.

Patent registration number HU 217,496 discloses a geothermal insulation system in the case of which air is made to flow through a heat exchanger installed in the earth, and then the heated/cooled air is circulated in the air duct arranged along the surface of the internal walls of the building. The disadvantage of the solution is that the temperature of the air circulated through the internal wall will never be high enough to ensure a comfortable room temperature, so it is primarily used to maintain the temperature in unheated rooms or heating up rooms that are to be subsequently heated, as it does not permit the temperature of the internal wall to drop to under approximately 7 to 10° C.

The objective of the invention is to provide an insulation system and method that are free of the disadvantages of the solutions according to the state of the art.

The object of the invention also relates to a geothermal insulation system that is easy to construct and that may be operated cheaply and reliably, with which buildings may be maintained frost-free in the winter period without the use of auxiliary energy (in other words, only using geothermal energy).

The objective of the invention is to optionally make the cooling of the building possible during the summer period by using the insulation system or method.

In the context of the invention winter period means those months/days when the external temperature continuously or periodically falls to under 5° C., and the summer period means those months/days when the external temperature continuously or periodically rises to over 20° C. The winter and summer periods depend on the geographical position of the building. In Hungary the winter period means the winter months, but occasionally all or a part of the months of November and March may be included in this period, but, of course, temperatures under freezing point may also occur in late autumn and early spring. In Hungary the summer period means the summer months, and depending on the weather, certain spring and autumn days are also included in this period.

The invention is based on the recognition that if the air heated or cooled using geothermal means is not supplied to the interior of the building, instead it is circulated over the external surface of the building, then air at a temperature of 7 to 10° C. is sufficient to reduce the heat loss of the building in winter, and to prevent the building from heating up from the outside in summer.

The task was solved in accordance with the invention with the geothermal insulation system according to claim 1.

Individual preferred embodiments of the invention are specified in the dependent claims.

Figure 2:
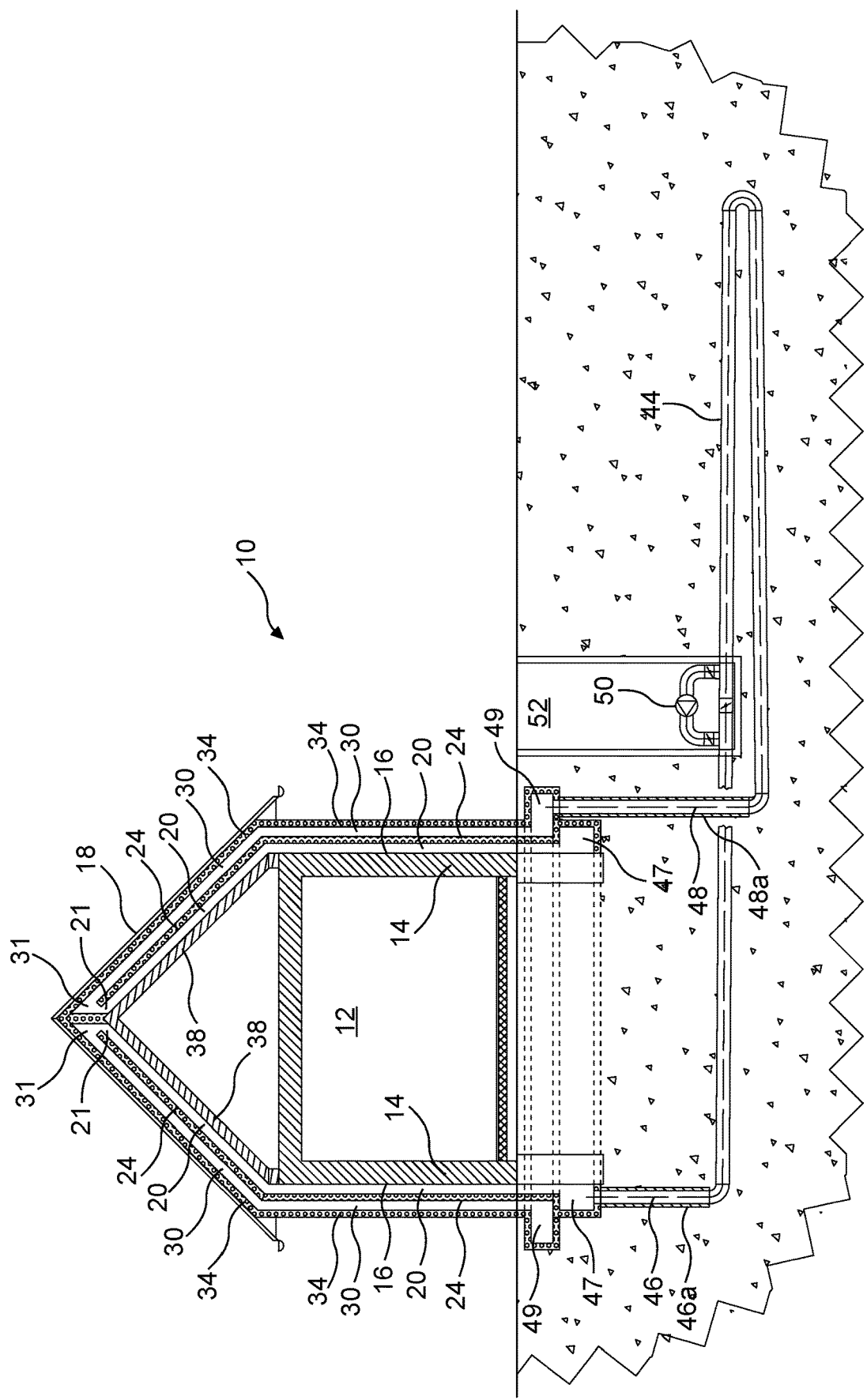
Figure 3:
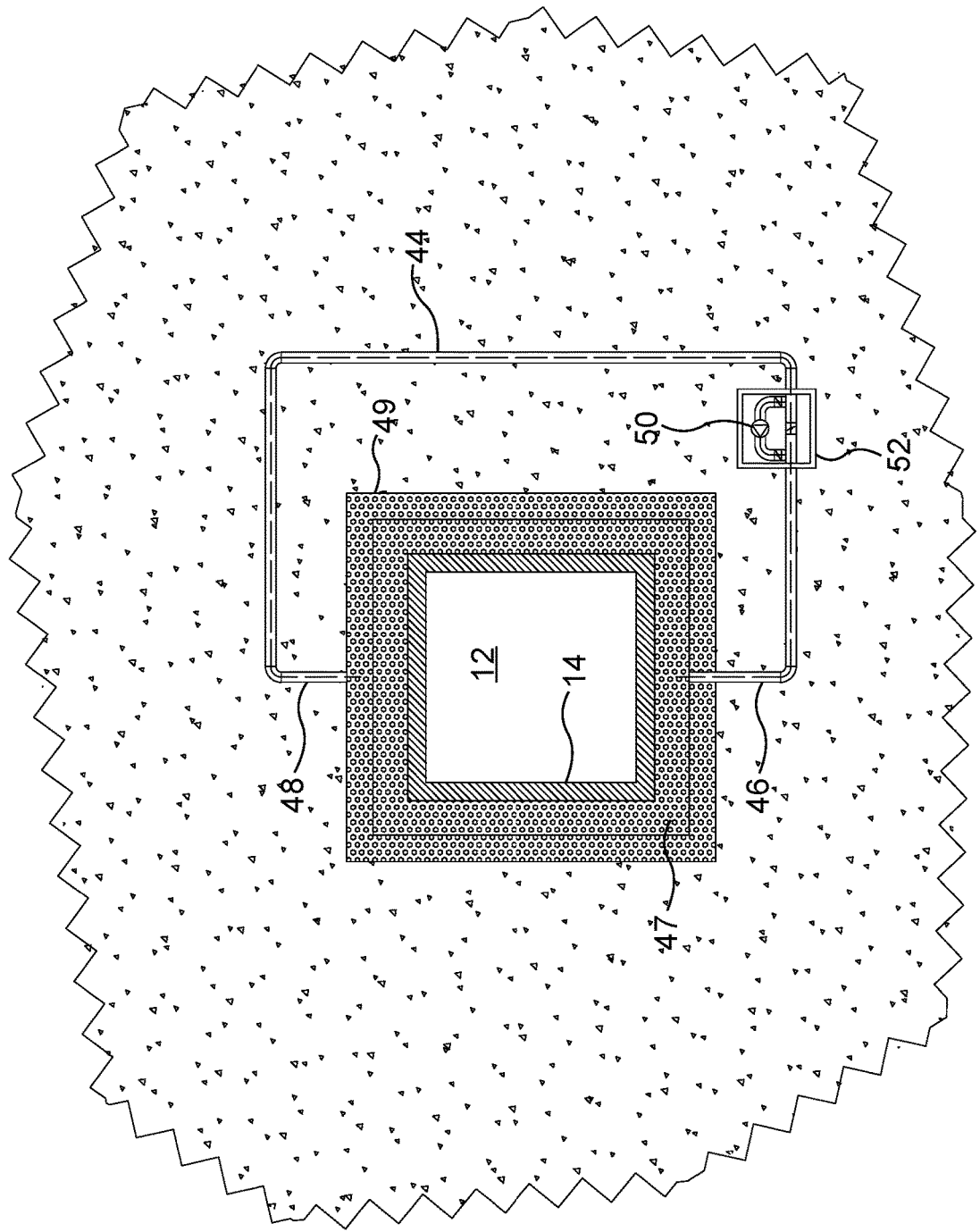
Figure 4:
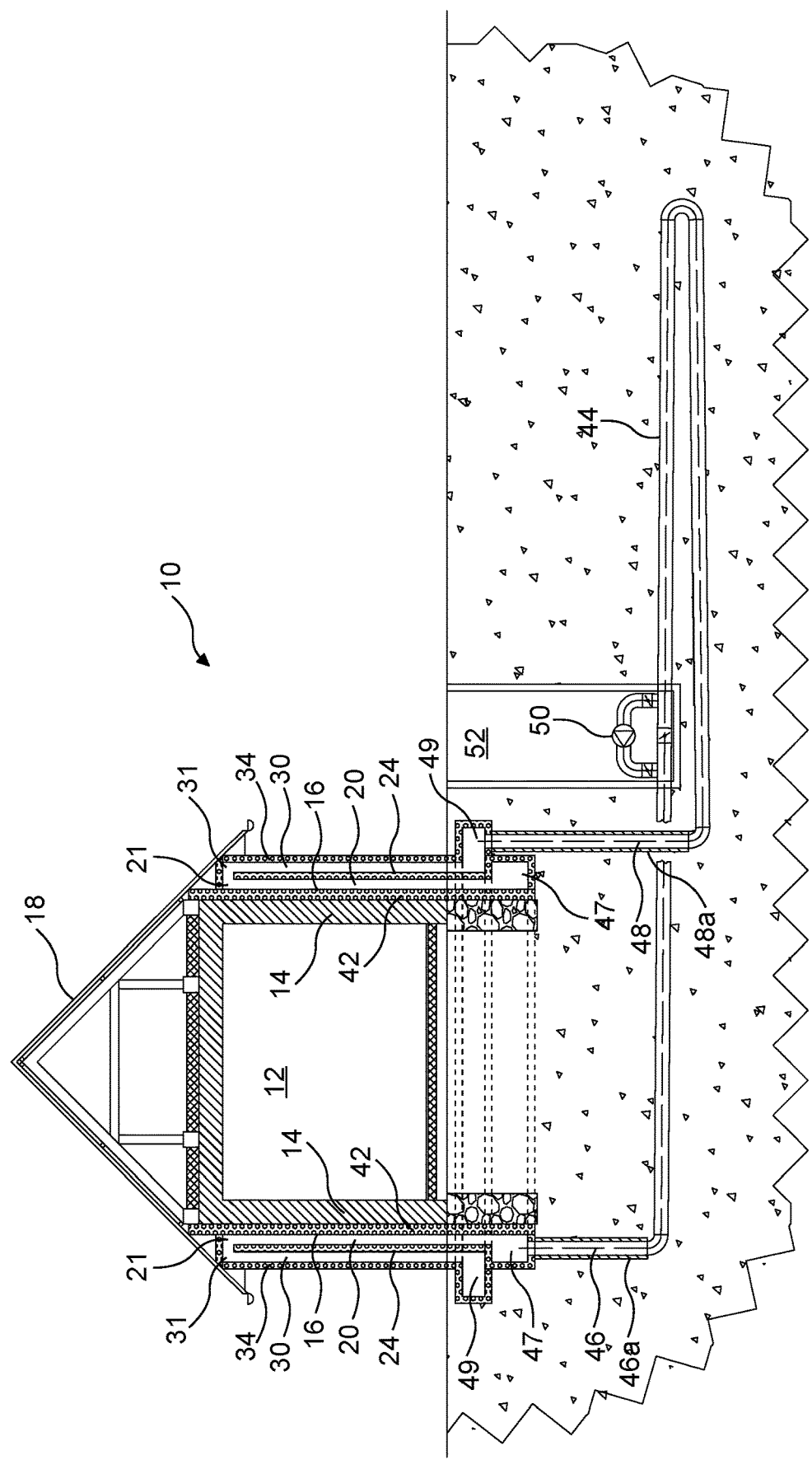
Figure 5:
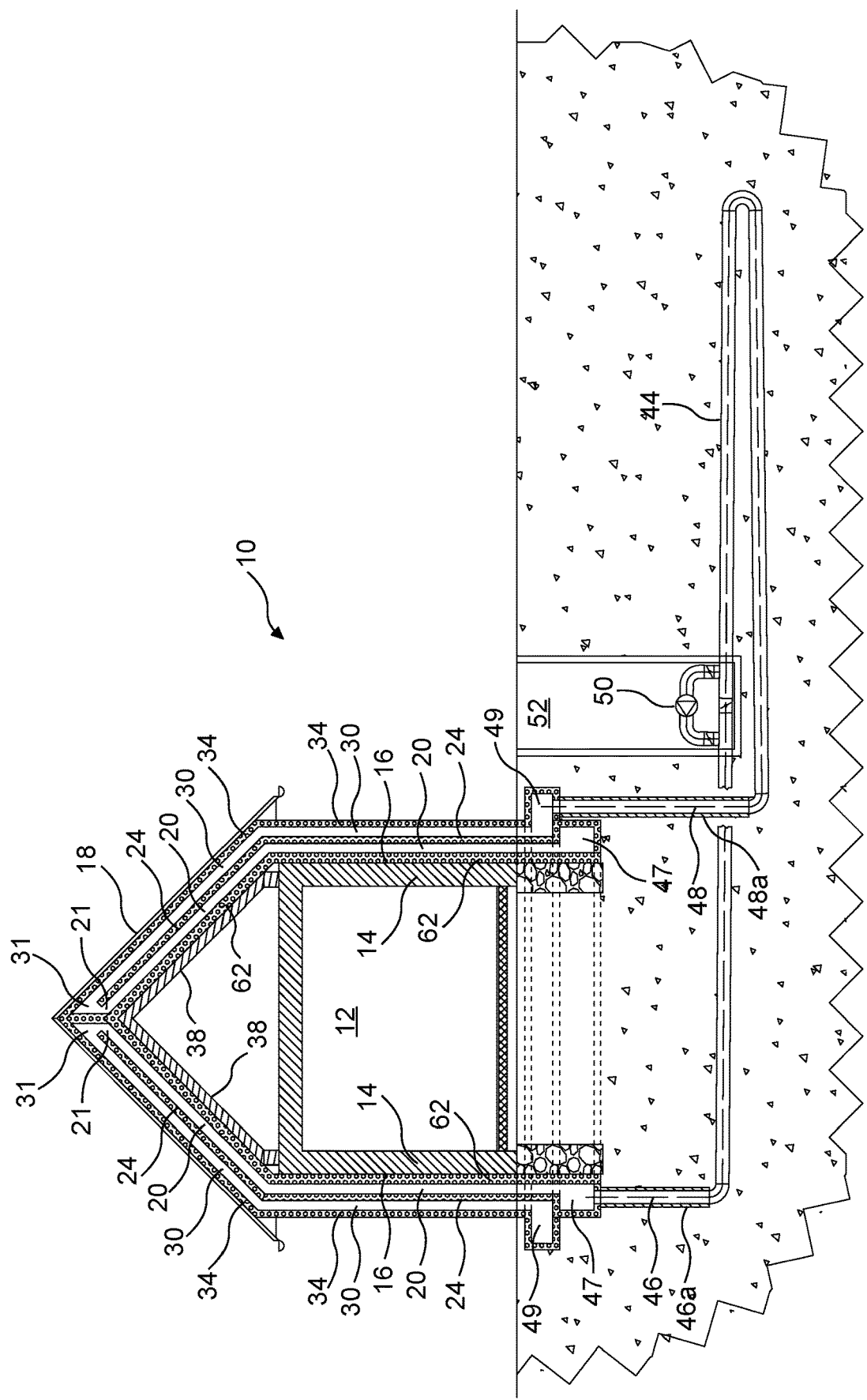
Figures 6, 6A:
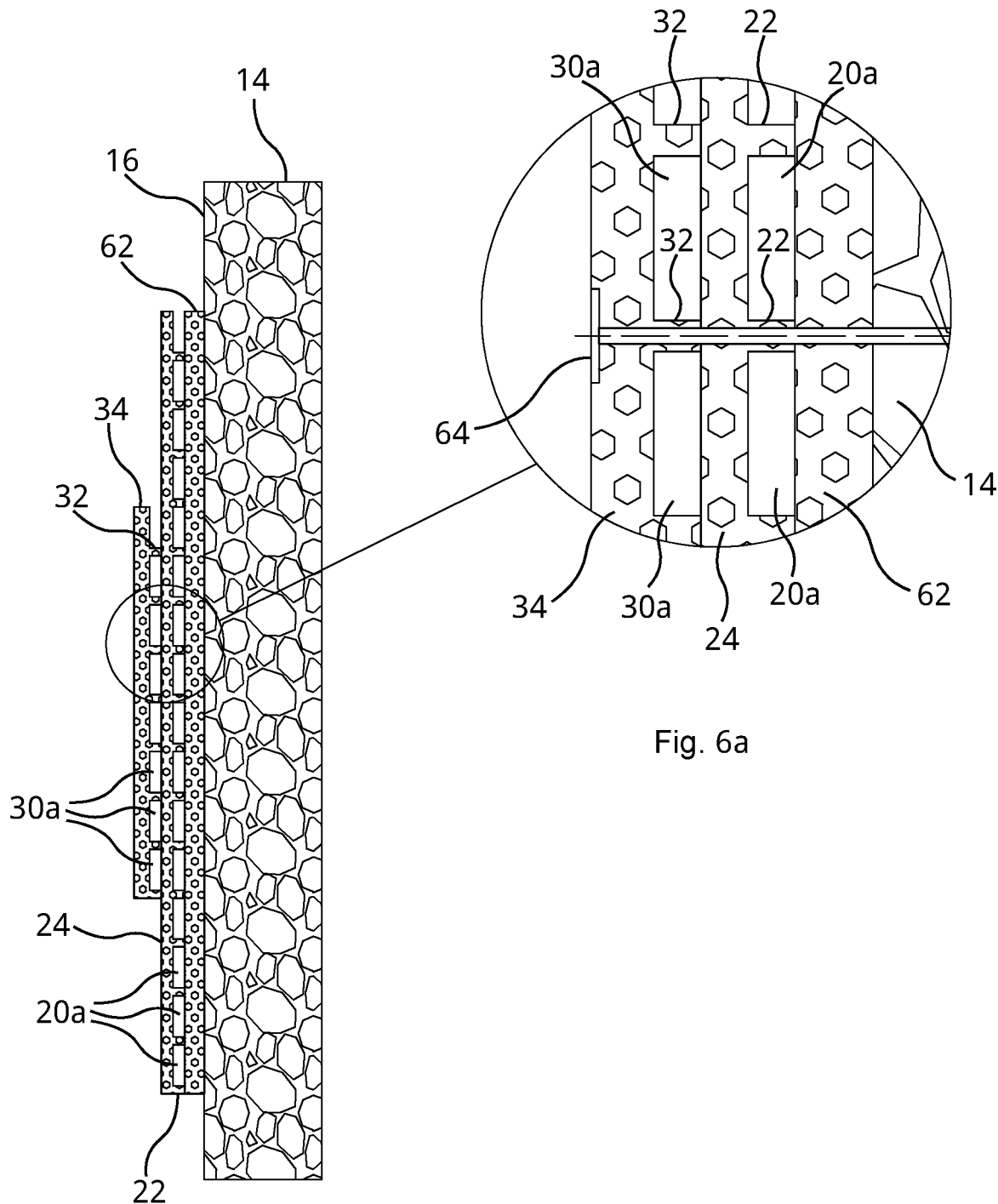

Further details of the invention will be explained by way of exemplary embodiments with reference to Figures, wherein:

FIG. 1 depicts a schematic cross-sectional view of a first embodiment of a building provided with the geothermal insulation system according to the invention, FIG. 2 depicts a schematic cross-sectional view of a second embodiment of a building provided with the geothermal insulation system according to the invention, FIG. 3 depicts a top view of a conceptual outline of the insulation system according to FIGS. 1 and 2, FIG. 4 depicts a schematic cross-sectional view of a third embodiment of a building provided with the geothermal insulation system according to the invention, FIG. 5 depicts a schematic cross-sectional view of a fourth embodiment of a building provided with the geothermal insulation system according to the invention, FIG. 6 depicts a top cross-sectional view illustrating a preferred embodiment of the insulation panels of the geothermal insulation system according to the invention in mounted position, and FIG. 6*a* depicts an enlarged detail of FIG. 6.

FIG. 1 depicts an exemplary embodiment of the geothermal insulation system 10 according to the invention that serves for the external insulation of a building 12. The building 12 has an external wall 14 and a roof structure 18. In the case of this embodiment the insulation system 10 is connected to the external surface 16 of the external wall 14.

In the insulation system 10 an internal air chamber 20 is formed along the external surface 16 in such a way that internal insulation panels 24 are fixed to the external surface 16 of the building 12 with internal spacers (not shown). According to a possible embodiment the spacers contain a supporting structure secured to the external surface 16 of the building 12 and a frame structure fixed to that, and the internal insulation panels 24 are affixed to the frame structure. Naturally, other forms of securing are also conceivable. Another preferred embodiment of the insulation panels 24 and the spacers is presented in connection with FIG. 6.

The air chamber 20 extends parallel to the wall 14, and preferably covers a significant portion of the wall 14, in this way the heating or cooling of the wall 14 may be achieved over a large surface.

An external air chamber 30 is formed on the other side of the internal insulation panels 24, in such a way that external insulation panels 34 are secured to the external side of the internal insulation panels 24 with external spacers. The securing on the external side in the case of the embodiment described above can be carried out, for example, by securing the external spacers to the frame structure of the internal spacers. The internal insulation panels 24 and the external insulation panels 34 are preferably made of polystyrene, for example from the basic material with the commercial name Styrofoam.

The thickness of the internal air chamber 20 and of the external air chamber 30 (in other words their dimension perpendicular to the external wall 14 surface) is preferably at least 1 cm, and preferably at the most 5 cm.

The upper region 21 of the internal air chamber 20 and the upper region 31 of the external air chamber 30 are connected to each other in such a way so as to permit air communication, so that the air may be circulated in essentially the entire volume of the air chambers 20 and 30, as will be described in more detail at a later point. The connection may be implemented with one or more openings provided in the upper region of the internal insulation panels 24, for example, and the several openings may be contiguous or separated from each other. Another possibility is that the external and the internal air chambers 20, 30 are closed off by a common air-sealing element at the top, but the internal insulation panels 24 end at a lower height, thereby permitting the air to move freely between the upper edge of the internal insulation panels 24 and the common air-sealing element from one air chamber 20 into the other air chamber 30. In the case of the preferred embodiment shown in FIG. 2, the first and second air chambers 20, 30 run up to under the roof structure 18 of the building 12, therefore the space under the roof structure 18 (typically the attic) may also be heated or cooled. The external insulation panels 34 are secured on the side of the roof structure 18 facing the internal space (in other words the interior of the building 12), to the roof beams that usually form the roof structure 18 for example, by securing the aforementioned frame structure, for example, by leaving a space or without leaving a space, or in another way, or the external insulation panels 34 may also be secured to other load-bearing structures. The internal insulation panels 24 are preferably fixed onto the internal side of the external insulation panels 34 with spacers, either directly onto the external insulation panels 34, or onto their fixtures. Preferably a space-dividing structure 38 is arranged under the roof structure 18 in such a way that the internal air chamber 20 under the roof structure 18 is delimited on the one side by the internal insulation panels 24 and by the space-dividing structure 38 on the other side. The space-dividing structure 38 may be provided with insulation elements identical to the insulation panels 24, 34, but other types of insulation elements, or other space-dividing elements (such as plasterboard) may also be used.

In this case the upper regions 21, 31 of the external air chamber 30 and the internal air chamber 20 connected to each other are the regions at the highest point, under the roof structure 18.

The geothermal insulation systems 10 that can be seen in both FIG. 1 and FIG. 2 also have a soil-air heat exchanger 44 installed in the soil in the vicinity of the building 12. A first air duct 46 connects the soil-air heat exchanger 44 with the internal air chamber 20, and a second air duct 48 connects the soil-air heat exchanger 44 with the external air chamber 30.

In the case of the especially preferred embodiment shown in FIGS. 1 and 2, at the bottom of the internal air chamber 20 and the external air chamber 30 there is preferably an internal distribution chamber 47 and an external distribution chamber 49 that run around the perimeter of the building 12, and the first air duct 46 and the second air duct 48 are connected to the internal distribution chamber 47 and to the external distribution chamber 49 on opposite sides of the building 12, as presented from above in the conceptual view according to FIG. 3. Naturally several air ducts 46 and 48 may lead to the heat exchanger 44, or the internal distribution chamber 47 and the external distribution chamber 49 may be connected to several soil-air heat exchangers 44.

The first air duct 46 and the second air duct 48 preferably run vertically or nearly vertically, however, for the sake of better illustration these have been shown to be lying down in the lateral direction in FIG. 3.

An air and water-tight pipe may serve as the soil-air heat exchanger 44, which is preferably ribbed on the outside, so that the exchange of heat may be implemented over a greater surface as a result of the ribs.

The soil-air heat exchanger 44 pipe preferably rises monotonously preferably from the lower end of the second air duct 48 up to the lower end of the first air duct 46, in this way, in the winter period, the air which is constantly being warmed up in the soil automatically (even without the use of auxiliary energy) flows from the second air duct 48 into the first air duct 46, in other words from the direction of the external air chamber 30 to the direction of the internal air chamber 20.

The soil-air heat exchanger 44, the first air duct 46 and the second air duct may also be provided as a single element.

The first air duct 46 and optionally the second air duct 48 are preferably provided with a heat-insulated, for example, external insulating covering 46a, 48a, therefore the temperature of the air passing through it is not or only slightly cooled or heated by the soil at a temperature that varies in the vertical direction.

An auxiliary fan 50 serving to make the air flow is connected to the soil-air heat exchanger 44, with which air circulation may be ensured in the summer period.

The auxiliary fan 50 is preferably arranged in a fan pit 52 recessed in the soil in such a way that the first air duct 46 passes through the section of the fan pit 52 where the auxiliary fan 50 is installed. The fan pit 52 makes it possible to access the auxiliary fan 50, and in this way it can even be switched on and off manually (such as by opening/closing one or more butterfly valves) when changing over to winter or summer operation. Naturally switching the auxiliary fan off and on may be automated to be in accordance with the season or controlled remotely in a known way.

The soil-air heat exchanger 44 is recessed into the soil at least 1 metre deep, preferably at least 1.5 metres deep, as here the temperature is nearly constant, and preferably a maximum of 2.5 metres deep so that the installation costs are not disproportionally high. The actual depth must be selected depending on the geographical features. At a depth of one and a half metres the soil temperature recorded in the literature is about 7 to 10° C., but, naturally, this value may also be deviated from. This is taken into consideration when selecting the recess depth of the soil-air heat exchanger 44. It is also a consideration whether the insulation system 10 is only to be used for heating or also for cooling. If it is to be used for both, then the soil temperature of 7 to 10° C. may be used especially well, but the range of 5 to 15° C. is also suitable, if it is to be used only for heating the heat exchanger 44 may be installed in an area of soil with a much higher temperature (in other words much deeper).

The soil-air heat exchanger 44 is preferably provided as a geothermal collector, in other words it is basically formed as a horizontally installed pipe with the feature that the first air duct 46 connected to the internal air chamber 20 preferably enters the soil-air heat exchanger 44 at a lower level than the second air duct 48 connected to the external air chamber 30. This further promotes the creation and maintenance of automatic air flow in the winter period. In case only a small area is available a heat exchanger 44 formed as a geothermal probe (installed vertically) may also be used.

Similar embodiments have been illustrated in FIGS. 4 and 5. The same elements have been allocated the same reference numbers, and hereinafter only the differences will be presented. In the case of the insulation system 10 shown in FIGS. 4 and 5, a further insulation layer 62 is arranged on the external surface 16 of the external wall 14 of the building 12, which is preferably directly mounted onto the external surface 16. In this case the internal air chamber 20 is delimited on the one side by the insulation layer 62 and by the internal insulation panels 24 on the other side.

In the case of the geothermal insulation of the roof space (FIG. 5), the insulation layer 62 also covers the external side of the space-dividing structure 38.

In the case of an especially preferred embodiment, the internal and external insulation panels 24, 34 have the shape shown in FIG. 6. In the case of this embodiment the internal spacers 22 and the external spacers 32 are vertical ribs running on the side of the internal and external insulation panels 24, 34 facing the wall 14 that divide the internal air chamber 20 and the external air chamber 30 into several parallel ascending and descending internal and external air gaps 20a, 30a. Ascending and descending design are understood to mean that the air gaps 20a, 30a have a vertical component (they have an ascending dimension and a descending dimension). Preferably the parallel air gaps 20a, 30a are provided substantially vertically in the interest of enhancing circulation. The internal air gaps 20a are preferably connected together by the internal distribution chamber 47, while the external air gaps 30a are connected together by the external distribution chamber 49. The air gaps 20a and the air gaps 30a are connected together at the top via the interconnected upper regions 21, 31 of the air chambers 20, 30.

The spacers 22, 32 are preferably provided as an integral part of the insulation panels 24, 34.

The internal insulation panels 24 and the external insulation panels 34 may be secured to the wall 14 in a known way, such as by using wall anchors 64 that pass through the spacers 22 or 32 as well as through the insulation layer 62, as illustrated in the enlarged FIG. 6a. Naturally other screw or other fixing devices may be used.

The operation of the geothermal insulation system 10 according to the invention is as follows.

In the winter period the ambient temperature in the heat exchanger 44 recessed in the soil is approximately 7 to 10° C. When the temperature of the external air falls to under this value the external insulation panels 34 and, along with this, the air in the external air chamber 30 also cool down to under this value. If the temperature of the air in the external air chamber 30 cools down to a temperature cooler than the temperature of the air in the heat exchanger 44, the cooled, cooler air descends due to its greater density and flows into the soil-air heat exchanger 44 recessed in the soil through the second air duct 48. The temperature of the air does not substantially change in the preferably vertically positioned air duct 48 supplied with insulating covering 48a, so the cold air does not get warmer, and descends until it reaches the soil-air heat exchanger 44. Here the temperature of the soil is approximately 7 to 10° C., which temperature the air gradually adopts as it passes through the heat exchanger 44. The flow of the warming air is facilitated by the slight ascending design of the soil-air heat exchanger 44. Due to the effect of the cooler air flowing downwards through the second air duct 48, the warmer air at soil temperature flows upwards through the first air duct 46 and gets into the internal air chamber 20 through the internal distribution chamber 47, where it rises, and flows from the upper region 21 of the internal air chamber 20 into the upper region 31 of the external air chamber 30, and in this way into the external air chamber 30 neighbouring the external environment. Here it starts to cool down once again as a result of which it descends, therefore the circulation of air is sustained in a stable form without the use of auxiliary energy as a result of the difference in densities due to the differences in temperature. As a consequence of the internal distribution chamber 47 and the external distribution chamber 49, as well as the first air duct 46 and the second air duct 48 connected on the opposite sides of the building 12 the level of the circulation may differ over the external surface 16 of the individual walls 14. The circulation is the most intense where the cooling of the air in the external air chamber 30 is the fastest, for example, the air cools more quickly over a shaded and/or windier wall 1, than over a sunnier and/or sheltered wall 14. Circulation differentiation can be further improved by using divided air chambers 20 and 30, as will be explained in detail in connection with another embodiment.

The result of the constant air circulation taking place through the heat exchanger 44 is that in the internal air chamber 20 the temperature, in practice, does not drop to under 7 to 10° C. In this way the external wall 14 of the building 12 is in contact with air at a temperature of 7 to 10° C. when the external temperature is much lower than this value. This significantly reduces the internal heating requirement of the building 12. The insulation system 10 according to the invention has especially great significance in the case of buildings where protection from freezing temperatures is the objective without the use of auxiliary energy. By using the insulation system 10 according to the invention buildings may be protected from freezing temperatures in which there is no active heating, and even where there is no electricity supply installed, as in the winter period the circulation of air at a few degrees starts and is maintained automatically.

In the case of buildings 12 with interior heating it is not desirable to heat up the internal air chamber 20 from the interior of the building 12, therefore it is preferred to provide the external surface 16 of the wall 14 with an insulation layer 62, as it can be observed in FIGS. 4 and 5. In such a case a significant saving in heating costs can be achieved by the insulation layer 62 coming into contact with air at a temperature of 7 to 10° C. and not with the external, cooler air.

The internal and external air chambers 20, 30 introduced under the roof structure 18 (FIGS. 2 and 5) provide similar temperature control for the roof space. It is especially important in the case of unheated roof spaces for there to be air at a temperature of 7 to 10° C. in the internal air chamber 20 delimiting the internal space, as this stabilises the temperature of the roof space, which results in a significant saving in heating costs in the storey under the roof space.

In the summer period the direction of air circulation is the same as that in the winter period, however, auxiliary energy is required to maintain circulation, which circulation can be provided, for example, by the auxiliary fan 50. In this case the auxiliary fan 50 transports the air at a temperature of 7 to 10° C. into the internal air chamber 20, then via its upper region 21 into the external air chamber 30, then finally back to the soil-air heat exchanger 44.

Various modifications to the above disclosed embodiments will be apparent to a person skilled in the art without departing from the scope of protection determined by the attached claims.

The invention claimed is:

1. A geothermal insulation system (10) for the insulation of an external surface (16) of a building (12), characterised by comprising:
   internal insulation panels (24),
   first internal spacers (22) attaching the internal insulation panels (24) onto the external surface (16) of a wall (14) of the building (12) in the mounted state such that an internal air chamber (20) is left between the internal insulation panels (24) and the external surface (16) of the wall (14),
   external insulation panels (34),
   second spacers (32) attaching the external insulation panels (34) onto an external side of the internal insulation panels (24) in the mounted state such that an external air chamber (30) is left between the external insulation panels (34) and the external side of the internal insulation panels (24) and an upper region (31) of the external air chamber (30) is in air communication with an upper region (21) of the internal air chamber (20),
   a soil-air heat exchanger (44) recessed into the soil,
   a first air duct (46) connecting the soil-air heat exchanger (44) with a bottom region of the internal air chamber (20),
   a second air duct (48) connecting the soil-air heat exchanger (44) with a bottom region of the external air chamber (30).

2. Insulation system (10) according to claim 1, characterised by that the internal air chambers (20) and the external air chambers (30) are divided into ascending and descending, parallel air gaps (20a, 30a).

3. Insulation system (10) according to claim 2, characterised by that the spacers (22, 32) are ribs forms integrally with the internal and external insulation panels (24, 34) and determining the ascending and descending parallel air gaps (20a, 30a).

4. Insulation system (10) according to claim 1, characterised by that an auxiliary fan (50) is provided in the soil-air heat exchanger (44) for circulating the air.

5. Insulation system (10) according to claim 4, characterised by that it has a fan pit (52) recessed in the soil through which the soil-air heat exchanger (44) passes, and the auxiliary fan (50) in the soil-air heat exchanger (44) is located in the fan pit (52).

6. Insulation system (10) according to claim 1, characterised by that in the mounted state it contains an insulation layer (62) attached to the external surface (16) of the building (12), and the internal air chamber (20) is formed between the insulation layer (62) and the internal insulation panels (24).

7. Insulation system (10) according to claim 1, characterised by that the soil-air heat exchanger (44) is an air and water-tight pipe ribbed on the outside.

8. Insulation system (10) according to claim 1, characterised by that the first air duct (46) and the second air duct (48) are provided with an external insulating covering (46a, 48a) and preferably both air ducts (46, 48) are substantially vertical.

9. Insulation system (10) according to claim 1, characterised by that the soil-air heat exchanger (44) is recessed into the soil at a depth of at least 1 metre, preferably at a depth of at least 1.5 metres.

10. Insulation system (10) according to claim 1, characterised by that the material of the internal insulation panels (24) and of the external insulation panels (34) is polystyrene-based.

11. Insulation system (10) according to claim 1, characterised by that the internal and external air chambers (20, 30) run up to under the roof structure (18) of the building (12) in such a way that the external insulation panels (34) are fixed on the side of the roof structure (18) facing an internal space beneath the roof structure (18), the internal insulation panels (24) are fixed on the internal side of the external insulation panels (34) with the second spacers (32), and further internal insulation panels are fixed on the internal side of the internal insulation panels (24) with the first spacers (22).

12. The insulation system (10) according to claim 11, characterised by that the upper region of the external air chamber (30) and the upper region of the internal air chamber (20) are the highest regions located beneath the roof structure (18).

13. Method for the insulation of an external surface (16) of a building (12) using geothermal energy, characterised by:
   taking air from a soil-air heat exchanger (44) recessed into the soil through a first air duct (46),
   making the air flow upwards in an internal air chamber (20) formed along the external surface (16) of an exterior wall (14) of the building (12),
   guiding the air to an upper region (21) of the internal air chamber (20) into an external air chamber (30) formed along an external side of the internal air chamber (20), and making the air flow downwards in the external air chamber (30),
   returning the air from the external air chamber (30) through a second air duct (48) into the soil-air heat exchanger (44).

14. Method according to claim 13, characterised by performing the method in the winter period without the use of auxiliary energy.

15. Method according to claim 13, characterised by making the air flow in the summer period in the first air duct (46) with an auxiliary fan (50).

16. Method according to claim 13, characterised by making the air flow upwards in the internal air chamber (20) divided into several parallel ascending air gaps (20a), and making the air flow downwards in the external air chamber (30) divided into several parallel descending air gaps (30a).

* * * * *